Dec. 6, 1960 C. W. HANKS ET AL 2,963,530

CONTINUOUS HIGH VACUUM MELTING

Filed July 27, 1956 2 Sheets-Sheet 1

INVENTORS
CHARLES W. HANKS
HUGH R. SMITH, JR.
BY Lippincott & Smith
ATTORNEYS

INVENTORS
CHARLES W. HANKS
HUGH R. SMITH, JR.

BY Lippincott & Smith
ATTORNEYS

United States Patent Office 2,963,530

Patented Dec. 6, 1960

2,963,530

CONTINUOUS HIGH VACUUM MELTING

Charles W. Hanks, Orinda, and Hugh R. Smith, Jr., Berkeley, Calif., assignors, by mesne assignments, to Stauffer Chemical Company, New York, N.Y., a corporation of Delaware Filed July 27, 1956, Ser. No. 600,561

12 Claims. (Cl. 13—31)

This invention relates to apparatus for melting and outgassing materials in vacuo. Its primary field of usefulness is in the reduction into consolidated and substantially gas-free form of refractory, highly chemically-active metals, such as titanium and zirconium, which, in the form in which they are first prepared from their ores, are divided into rather small pieces or particles. Depending upon the particular refining process used, the crude form may be powder, granules, or metal sponge. The latter, even if originally in fairly large pieces, as delivered to the processor of ingots or the like, is divided into pieces that are small enough so that the material may be handled by screw or vibratory conveyors or feed mechanisms. For the present purposes, which of these forms the material may take is not of primary concern, as long as the division is into particles small enough so that the material may be forced through a duct and be delivered at the end thereof as a mass that substantially fills the duct cross-section. The feed may be by screw conveyor, gravity or vibratory, as long as the condition of filling the cross-section of the duct at its discharge end is fulfilled.

Whatever form the metals mentioned may take following the first process of production, they are certain to contain a considerable volume of dissolved, adsorbed, combined or otherwise included gas, from which they must be freed before or in the course of reducing them to massive forms that can be fabricated usefully. This can also be true of the more familiar and less refractory metals; there is, for example, a large field of use for oxygen-free copper. The invention can be applied to the preparation of such material as well as to other conductive substances, metals or quasi-metals, that are likely to contain gases which if not removed would interfere with their ultimate use.

Among the objects of the invention are to provide the means for melting and out-gassing metals and the like, originally supplied in divided form, that is suitable for use as a part of a continuous process, as distinguished from batch operation; to provide apparatus of the class described that utilizes unusually simple equipment for the purpose; to provide means for melting and outgassing divided conductive materials by controlled electrical bombardment in vacuo, wherein the discharge is completely stable and is not affected by the release of ionizable gas from a bombarded surface; to provide apparatus whereby the divided material to be treated can be introduced into the apparatus in this crude form, to emerge from the apparatus as a continuous, homogeneous ingot of substantially gas-free material, ready for further processing; and to provide means which can be adapted to the handling of materials in almost any degree of subdivision, ranging from relatively large chunks to dust-fine powders. Other objects and advantages of the invention will become apparent to those skilled in the art in the course of this specification.

Describing the invention broadly, it comprises a duct of tubular form and of sufficiently large lumen so that the material to be treated can be forced through it, from an open input end to an open discharge end. Both ends open into a vacuum system that connects with a pump of sufficient capacity to maintain the desired degree of vacuum irrespective of the liberation of gas from the treated material. In a preferred form of apparatus the vacuum so maintained is in the neighborhood of a 0.1 micron Hg pressure, since pressure in this general range is best adapted to the preferred form of heating and since, moreover, the amount of gas retained by the metal is a function of the vapor pressure existing in contact with it in the melt. The disposition of the duct depends in some degree upon the state of division of the material treated and the method of feed employed. With finely divided powders, packing tightly with small interspaces, the duct could be vertical and the feed upward; with larger or irregular lumps of material or with sponge-like material the duct is preferably mounted generally transversely, approaching more nearly the horizontal, although it may incline upward or downward to some extent. With freely running powders, the duct can even be bent, inclining sharply downward from its input end to permit use of gravity feed for filling the duct and forcing the material toward its discharge end, but it is generally preferred to mount the duct with a fairly slight slope. Whatever its disposition, the opening at its discharge end faces upward but inclines downward, the lower edge of the opening thus forming a lip from which the material falls. Means are provided for feeding the material continuously from the intake toward the discharge end of the duct. For most materials the most practical form of feed mechanism is a screw conveyor, the end of which projects into the intake end of the duct but does not extend as far as the discharge end, the material at the latter being forced forward by the continual thrust of the material behind it. Such a conveyor can be fed from a hopper which in turn is supplied through a vacuum lock in substantially conventional manner.

Means are provided at the discharge end of the duct for melting the material to be treated, at this point and at this point only, as fast as it is fed from the rear. The heating and the rate of feed are adjusted so that there is a zone of molten material that completely fills the open end of the duct, this material being constantly urged forward and dripping over the lip at the discharge end into a suitable receptacle below. This is preferably an ingot mold, including means for keeping a molten zone at its own surface and for continuously withdrawing an ingot from the bottom thereof. With the rate of feed and the rate of melting properly adjusted, the molten material at the discharge end of the duct forms, in effect, a gas-tight seal. Extending rearwardly from this molten zone is a zone where the material is heated by conduction from the melted material ahead of it. As the temperature rises, even before the melting point is reached, it loses gas rapidly, and this gas, being blocked by the liquid seal at the discharge end, diffuses backward through the interstices of the divided material to be discharged into the vacuum system at the input end of the duct. The heaviest evolution of gas occurs in the zone where melting is occurring. This gas is quite free to escape toward the rear but it will readily be seen that the hydrostatic pressure of even a millimeter or so of liquid is ample to prevent the escape of the evolved gas through the liquid seal. Furthermore, the melted materials have high surface tension; they wet the material behind the melted zone and the surface tension aids in keeping the layer unbroken.

In the broadest aspect of the invention the method of heating the liquid seal at the end of the duct is immaterial. It could be by arc discharge, pure electronic bombardment, or the duct can even be surrounded by an inductor (provided a nonconductive duct is used) and the material heated by eddy currents induced therein. To obtain the greatest benefit of the invention, however, the further feature thereof is employed which comprises bombarding the surface of the material in the duct by a controlled glow-discharge, initiated by a thermionic cathode mounted in a general plane parallel to the opening of the duct. In this form of discharge the major portion of the current-carriers are electrons and the voltages employed across the discharge path are relatively high, of the order of thousands of volts rather than hundreds as would be the case with a true arc. With a pressure of gas in the discharge area of a few microns Hg at most, and this pressure substantially constant, all of the gas molecules within the discharge path will be ionized. The relatively slow-moving positive ions remain in the gap for relatively long periods of time, and carry very little of the current, their principal effect being to neutralize the space charge produced by the current-carrying electrons, which space charge would otherwise limit electron flow, but to neutralize it only in part, so that no negative resistance arc forms.

As a result of the space-charge neutralization the cathode can be at a much greater distance from the molten surface forming the anode than would otherwise be the case, for the same potential difference between the two electrodes. Because of the greater spacing, the field between the two electrodes is more uniform and the bombardment and consequent heating of the surface is also more uniform. Furthermore, the cathode can be mounted within a focusing electrode or electrodes, which serve to concentrate the electron discharge on the liquid surface itself, substantially to the exclusion of the edges of the duct. It will be recognized that at least the discharge end of the duct must be made conducting when bombardment heating is used, in order to contact the treated material itself. Such a conducting duct, or discharge end thereof, could be of graphite; preferably, however, it is made of metal, usually copper, and is water cooled. A protective layer of solidified material is thus formed where molten material first comes into contact with the cooled surface and as a result the latter is not attacked as it would be, for example, by liquid titanium or zirconium.

It will be appreciated that a controlled electronic-ionic discharge of the type described is possible only when the bombarded material is substantially gas-free, since the control depends upon there being only a limited number of ions in the discharge region. In melting powders or sponges that are gassy, gas is liberated in localized "bubbles" or bursts. Were the gas being evolved from the bombarded surface itself, such a localized burst would immediately supply both a large number of ionized positive ions to reduce further the space charge in this particular area, but also a large number of additional electrons to bombard the surface at this point. Such a sudden, localized bombardment is frequently sufficient to heat the material within the area in question to the vaporizing point, thus supplying additional ions, forming an arc crater and resulting in a "hard core" arc. The voltage across the discharge path drops and the current increases enormously. The result is that circuit breakers or other protective devices open, if such have been prudently provided. Otherwise the arc becomes utterly uncontrollable unless the circuit is broken manually.

Considering the nature of the instability caused by such bursts of released gas, it will be apparent that the bursts are important only because they take place in the discharge path and can result in the formation of a true arc more quickly than the ions can diffuse away from this point, and that, furthermore, discharges of this character are inherently unstable, forming a low resistance path which can absorb all of the power available from the supply. The same amount of gas liberated elsewhere within the system, even though both ends of the duct are in the same tank, diffuses generally throughout the tank. Gas liberated from the intake end of the duct cannot concentrate in the discharge path. The whole nature of the installation requires that a fairly large volume be under vacuum, and this being the case a sudden burst of gas liberated will not greatly affect the pressure in the tank as a whole. Furthermore, since the liberated gas must diffuse toward the input end of the duct through the voids in the material within the duct, gas released as a burst will filter through the duct gradually and be released at a substantially constant rate, the material within the duct acting as a pneumatic filter.

With any given vacuum system opearting under dynamic conditions, the degree of vacuum that can be maintained in a chamber that is being pumped will depend upon the rate at which gas is being liberated into that chamber. With the apparatus of the present invention, the rate at which gas is being liberated depends upon the rate of feed of the material to be out-gassed, provided it is melted as fast as it is fed. Accordingly, the power expended in the discharge should be coordinated with the rate of feed. With the type of discharge under discussion the internal resistance of the power supply is preferably relatively low, so that the voltage drop across the discharge varies little with variations in the discharge current. Furthermore, under the preferred conditions of operation the current is space-charge limited; i.e., the neutralization of the space charge by the positive ions within the discharge is incomplete. When the pressure in the discharge area rises, more particles are provided to be ionized, resulting in more positive ions and a greater neutralization of space charge and hence a larger current flow in the discharge region. With a low resistance power source this results in little voltage drop. To a first approximation the power expended in the discharge is a linear function of the amount of gas liberated. Within a fairly extensive operating range, therefore, the device is self-regulating, the power available to melt the material being proportional to the rate of feed. Hence, normal variations in this rate do not result in instability or faulty operation. A detailed description of a preferred embodiment of the invention that follows is illustrated by the accompanying drawings, wherein:

Figure 1:
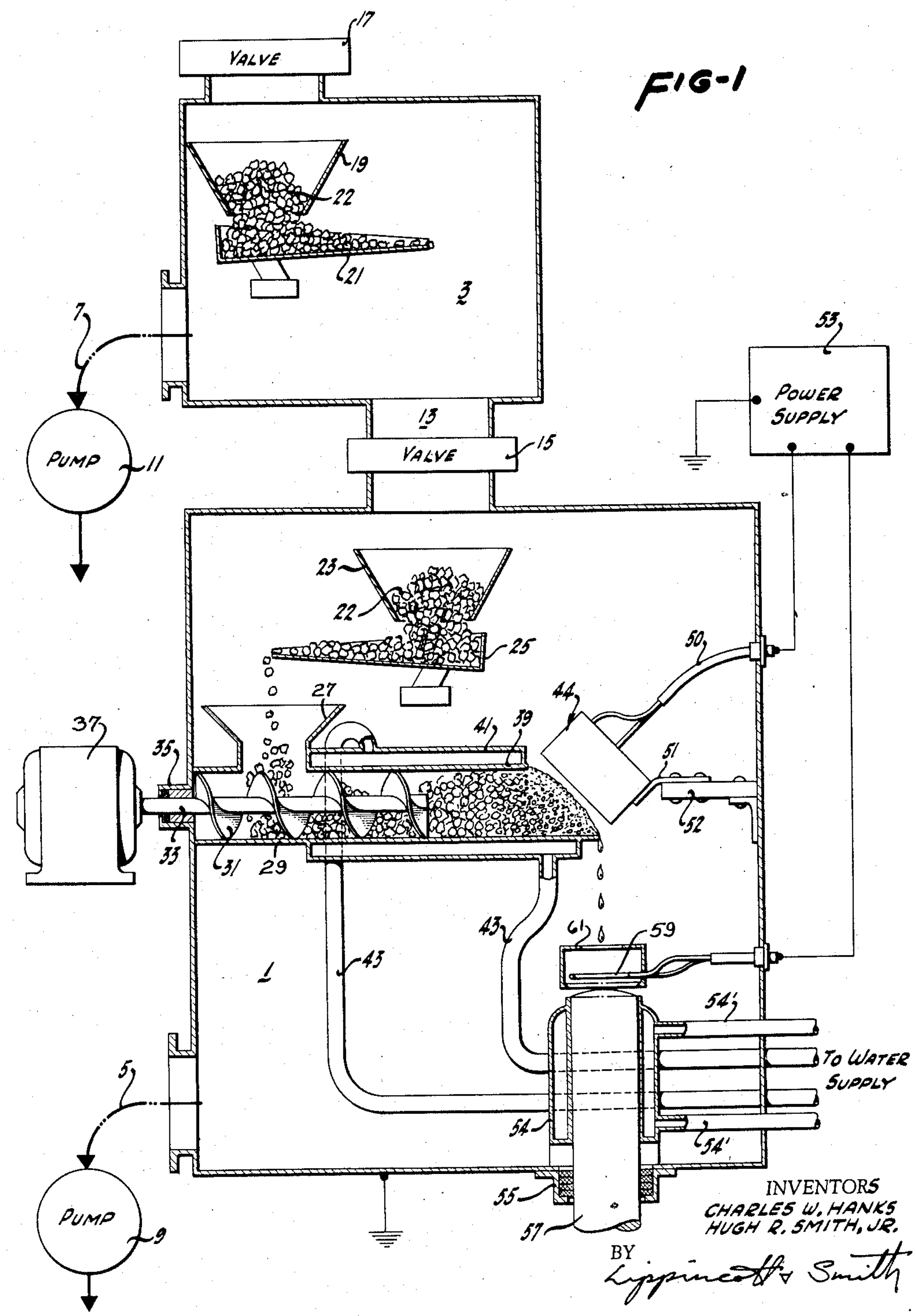
Fig. 1 is a purely schematic diagram of an installation for the continuous production of homogeneous ingots of titanium from titanium sponge, embodying the present invention.

In the diagram of Fig. 1, illustrative of a complete installation including associated equipment not directly a part of the present invention, the various elements are shown in purely schematic form, without indication of their actual structure. The elements illustrated are either conventional, so that their structure is well known, or will be described in detail hereinafter.

In Fig. 1 the vacuum system comprises a main treatment chamber or tank 1, and a vacuum lock 3, these being provided with exhaust ports communicating with ducts 5 and 7 respectively, leading to exhaust pumps 9 and 11. The main tank 1 connects to the vacuum lock 3 through a wide feed passage 13 that may be closed and sealed by a gate valve 15. The vacuum lock chamber 3 preferably has a relatively small volume as compared with the main tank 1. It is provided with a loading gate 17, also preferably a vacuum-tight gate valve, through which the material to be treated can be introduced.

Immediately below the gate 17 is positioned a feed hopper 19 that supplies a vibratory feed mechanism 21. These parts are so arranged that the apparatus 21 operates to feed divided material 22 from the hopper off of its end and drop it through the channel 13 when the gate valve 15 is open. Material falling through the gate valve is received by a second hopper 23 within the main tank Hopper 23 also is shown supplying a vibratory feed mechanism 25, adapted to supply a flow of material to the apparatus with which the present invention is directly concerned at the desired rate.

As stated, this apparatus is conventional and its operation is well understood. To place a charge of material for treatment in it, gate valve 15 is closed, valve 17 is opened and hopper 19 is filled with a charge of the material to be treated. Valve 17 is then closed and the lock is exhausted through duct 7 by pump 11 to substantially the same degree of vacuum as that at which the main tank 1 is maintained. This evacuation removes the major portion of the gas held in the interstices of the sponge and the interspaces between particles. Pump 11 has sufficient capacity to accomplish this evacuation before hopper 23 can be emptied at the prescribed rate of feed. When the required vacuum has been established within the vacuum lock 3, valve 15 is opened and the feed mechanism 21 is activated. The operation of the feed mechanism is adjusted so that it operates much more rapidly than the feed mechanism 25 within the main tank, filling the hopper 23 before the charge in hopper 19 is exhausted. The operation is then repeated, feed mechanism 25 working continuously while feed mechanism 19 works intermittently, and the vacuum in the main tank 1 is not broken at all during the operation of the apparatus.

The pump 9 should have sufficient capacity to reduce the base pressure in the tank 1 to a fraction of a micron of Hg, and to maintain the operating pressure within the tank, when gas is being evolved, to something of the order of 2 or 3 microns Hg. It follows that pump 11 should be able to reduce the pressure within the vacuum lock to the operating pressure within the time allowance given by the capacity of the hopper 23.

The continuous feed from the vibrator mechanism 25 supplies a third small hopper 27, the bottom of which opens directly into a duct 29 containing the feed screw 31 of a screw conveyor. The shaft 33 of the conveyor extends outwardly through the rear end of duct 29 and through a vacuum-tight seal or gland 35, where it connects to a drive motor 37. The latter is preferably of the adjustable-speed type, although this may not be necessary in an installation adapted to handle material of a constant grade and average gas content.

The feed screw 31 forces the material into the forward end 39 of the duct. This end at least of the duct must be of conducting material; the remainder of the duct may be, and usually will be, of metal as well. It must also be able to withstand the temperature of the molten metal at its outlet or discharge end and to withstand possible chemical attack or dissolution in the molten metal. For some purposes graphite will meet these requirements. Preferably, however, this discharge end of the duct is made of metal of high heat conductivity, usually copper, and is fluid cooled, as, for example, by a water-jacket 41 connecting through leads 43 to a water circulating system. The cooling system must be fluid-tight; in one embodiment of the invention the jacket and ducts are "Heliarc" welded of copper to insure continuity.

The duct 29 is shown in the present case as being horizontal. It is generally preferable that it extend generally transversely across the tank 1, but it may slant upward or downward. It is also generally preferable that the opening in the discharge end should face generally upward and in nearly all cases it should be inclined with respect to the horizontal as shown. The preferred angle of the opening for most purposes lies between 30 and 45 degrees with the horizontal. With a tubular duct, the slanted orifice provides a pouring lip which guides the molten metal from the fusion zone to drop in a definite course instead of falling in a more or less random fashion from any point of the melted surface. It should be mentioned, however, that because of the high surface tension of the melted material it has proved possible to maintain a complete liquid seal covering an overhanging surface, and that it has also proved possible to maintain a seal and practice the invention using a vertical duct fed from below to form a horizontal liquid layer. The use of a transverse feed and upward-facing discharge are therefore precautionary measures that lead to simpler mechanical structures, rather than necessary features of the invention.

Figure 2:
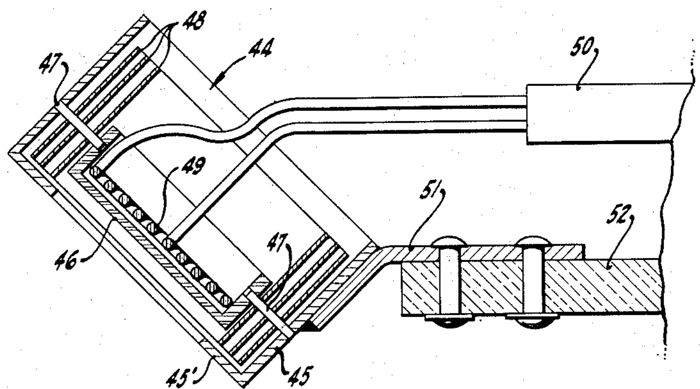
Fig. 2 is an axial sectional view through one form of thermionic cathode adapted for use in the invention.

A thermionically-emissive cathode structure, indicated generally in Fig. 1 by the reference character 44, is mounted with its emissive surface spaced from and generally parallel to the discharge orifice of the duct. Various forms of structure have been used for the cathode, and have given successful operation. Fig. 2 illustrates the structure that to date has proved the most satisfactory. This comprises a tubular shield 45, open at the top and with an inwardly extending annular flange 45′ at the bottom, this flange acting as a focusing electrode to concentrate the discharge on the face of the material filling the duct 29. The cathode itself is of the indirectly heated type, comprising a shallow, circular carbon boat or flat-bottomed dish 46, of a diameter substantially equal to that of the central opening in the flange 45′. The boat is supported from the walls of the shield 45 by a plurality of tungsten pins 47, extending radially inward from the shield into the carbon boat. One or more heat shields, preferably of polished refractory metal such as molybdenum, surround the cathode boat and are also held in place by the pins 47 passing through them. The cathode is heated by radiation from a coil of tungsten wire 49, positioned within the boat and supplied through leads 50, which extend upward through the top of the shield and out through insulators in the wall of the tank 1. The entire structure is supported by means of a bracket 51 that is welded to the shield 45 and secured to an insulating support-beam 52, which has its other end secured to the wall of the tank in any suitable fashion. The beam 52 may be of steatite or other ceramic.

The surface of the carbon boat is itself a good emitter of electrons when heated. In the course of operation, however, it gradually acquires a coating of the treated material, probably largely by spatter from the infalling electrons, although in part, perhaps, by actual evaporation that is too slow and diffuse to lead to the formation of an arc. This coating actually improves the emissive quality of the cathode surface. Directly heated cathodes can be used, but it has been found that accumulation upon them of deposits of the bombarded material change their resistance locally, resulting in hot and cold spots, and that the resulting effects are cumulative, leading to shortened cathode life. Indirectly heated cathodes, such as that just described, have proved to have indefinitely long lives.

The cathode and its shield are operated at the same D.C. potential, several thousand volts negative to that of the duct 29 and the material within it. For example, duct 29 may be and usually is electrically connected to the tank 1 and grounded. The carbon boat 46 may be connected to either lead of the heater filament 49, as by physical and electrical contact between the boat and the outermost turn of the spiral heater filament, as shown, or it may be connected in any other way to a negative voltage source. The spacing between the emissive surface of the cathode and the opening of the duct is two or more times that which will permit the required amount of current to flow in a pure electronic discharge, at the same voltage applied with the current limited by space charge effects. Electric power is provided by a conventional type of power supply 53. This also supplies low voltage alternating current for the heater coil 49. The voltage used is preferably as high as can conveniently be handled, without either causing unwanted discharges outside of the intended path, initiated by cold-cathode emission at points of field concentration, or requiring excessive insulation expense.

An ingot mold 54 is positioned within the tank, immediately below the lip formed at the discharge end 39 of the duct 29. The mold can be formed in the same general manner as the end 39 of the duct, i.e., of copper with a surrounding water-jacket supplied by tubing 54' connecting with a water supply. The mold is open at the bottom, and immediately below it is a seal 55 through which an ingot 57, formed within the mold, can be continuously withdrawn without breaking the vacuum in the tank 1. A thermo-emissive cathode 59 is mounted immediately above the opening in the top of the ingot mold. The cathode can be formed of a single turn of tungsten wire or tape, substantially coaxial with the mold 54, and surrounded by an annular focusing shield 61 having an opening through which the material can fall to the top of the ingot. Cathode 59 can be connected in parallel with the heater of cathode 44.

In operation the conveyor screw 31 feeds the divided material, here assumed to be titanium sponge, into the forward end 39 of the transverse feed duct. The rate of feed may or may not be such as to fill the screw completely. The screw, however, terminates at some distance to the rear of the discharge opening of the duct and material piles up at this point until it is somewhat compacted and forced forward by that arriving from behind. As the mass of material moves forward within the duct, its temperature gradually rises by conduction from the discharge zone, except where it is cooled by contact with the cooled duct walls.

Because of its spongy nature, however, the material is not a good conductor of heat and the rise of temperature is very gradual until the discharge opening is almost reached. Here the temperature gradient becomes very steep. It is within this region of high temperature-gradient that most of the evolution of gas from the metal occurs. At the actual discharge opening the melting is complete, and the metal completely fluid. Some of this fluid rolls down the surface and drips off the discharge lip into the ingot mold. Some sinks downward or seeps back into the spongy material at the rear, resolidifying and in so doing raising the temperature of the material with which it is in contact, to cause further evolution of gas therefrom.

Material seeping down through the mass and coming into actual contact with the water cooled duct immediately solidifies; in solidifying it shrinks enough so that it clears the duct walls and can still be forced forward through the duct, instead of sticking or freezing thereto. It is quite possible that once-molten material that has seeped to the rear and resolidified may, upon reaching the liquid zone, again seep back and thus go through the melting and solidification process several times before it finally falls into the ingot mold 54.

The density of the original material is low, because of both its spongy nature and the interstices between the various particles thereof. It is still low as it leaves the end of the conveyor screw, but as it goes forward it is continually compacted, at first purely mechanically, later by the filling of the interstices with molten and resolidified material, then by a semi-liquid or pasty mass from which substantially all of the gas has been removed, and finally by a liquid seal in the discharge opening. As the material becomes more and more compacted, diffusion forward through it becomes more and more difficult, and when it is actually liquified no gas can escape through it; the gas pressure is so low that even an extremely thin liquid film is sufficient to block the gas so that it cannot bubble through, and the temperature is so high that gas cannot be dissolved in appreciable quantities. The material that drops off of the end of the duct is therefore substantially gas-free. Its high surface tension holds it in the mouth of the duct until the liquid layer is of considerable depth, and the flow into the mold gathers in large drops at the lip of the duct, sometimes as large as a child's marble, before falling.

The bottom of the ingot mold 54 is plugged by the ingot 57, so that the mold forms a cup into which the metal drops. In starting the apparatus for the first time it can be plugged by any other material of proper dimension, e.g., a steel shaft which extends through seal 55 and into the mold, later to be discarded. Where the melted material touches the water-chilled wall of the mold it immediately solidifies, as was the case with the water-cooled duct, and therefore does not attack the mold. Enough discharge is maintained from the cathode 59 to the forming ingot to maintain a small pool of melted material at the upper end of the mold, into which the discharge from the duct falls and is promptly diffused therein, even though it may have cooled slightly, by radiation, in its fall. Only enough power is supplied to the discharge at the mouth of the mold to maintain a small liquid pool of this character at that point. This pool gradually freezes as the ingot is withdrawn, leaving no definite lines of cleavage or lamine but instead a completely homogeneous ingot which can be rolled, drawn, or subjected to any other treatment required for further fabrication.

While the complete apparatus described above gives a very simple and economical apparatus for delivering ingots in a one-stage, continuous process, it should be apparent that this is not the only application of the liquid-seal principle. Instead of the discharge of evolved gas being into the same general chamber as that wherein the outgassed material is discharged, a partition can be provided to divide the tank into two separate chambers operating under different pressures; e.g., the pressure at the discharge end of the duct can be held at a fraction of a micron and the heating applied by a pure electronic discharge (instead of a combined glow discharge involving both electrons and positive ions) or by induction. The heating can even be by true arc, with considerable advantage, over ordinary arc heating, in that by preventing discharge of the included gases into the arc path itself the arc stability is improved.

Such modifications, however, require a somewhat different degree of coordination between rate of feed and the rate at which power is supplied to heat the material just rapidly enough to maintain the liquid seal. If the included gases in the original material are separately exhausted and these other methods of heating are used, too slow a feed rate will permit such rapid melting of the material supplied that it will fail to fill the discharge orifice completely and thus will break the seal, while too rapid a supply will force unmelted material out of the end of the duct. With the complete apparatus described coordination of the various rates must still be maintained, but as has been shown there is a considerable range of operation wherein the power expended in the discharge that heats the material to melting varies directly with the rate of feed and thus automatically takes up any inequalities in the latter. The average rate of discharge is coordinated with the rate of feed by adjusting the latter so that the vacuum system can maintain the pressure within the tank at about the center of the range wherein the desired type of discharge can be maintained. Fluctuations about the average rate of feed, thus coordinated with the average degree of vacuum, then indirectly control the intensity of the discharge, as has already been described, giving a considerably wider tolerance than if the power expended in heating had to be directly coordinated with the rate of feed. With the equipment specifically described the heating power is controlled indirectly through a coordination of rate of feed and rate of evacuation, instead of directly.

From such considerations as these it should be clear that neither the apparatus nor the method aspects of this invention are restricted by the example used for illustrative purposes, all intended limitations being specified in the following claims:

We claim:

1. Apparatus for melting and outgassing in vacuo materials in divided form such as powder, granules, metal sponge and the like, which comprises the combination of elements designated as elements (*a*) to (*d*) inclusive and defined as follows:

(*a*): a duct for carrying said divided material and having intake and discharge ends;
(*b*): means for forcing said material through element (*a*) and out of the discharge end thereof, keeping said discharge end filled with said material;
(*c*): means for heating the material filling the discharge end of element (*a*) to melting, to form a liquid seal in said discharge end to prevent the escape of gas therethrough; and
(*d*): means for continuously exhausting through element (*a*) all gases liberated behind said seal in the melting of said material and simultaneously maintaining a vacuum at the discharge end of element (*a*).

2. Apparatus for melting and outgassing in vacuo materials in divided form such as powder, granules, metal sponge and the like, which comprises the combination of elements designated as elements (*a*) to (*e*) inclusive and defined as follows:

(*a*): a duct for carrying said divided material and having intake and discharge ends;
(*b*): means for cooling the discharge end of element (*a*) below the melting point of said material;
(*c*): means for maintaining both ends of element (*a*) under vacuum;
(*d*): means for forcing said material through element (*a*) and out of the discharge end thereof, keeping said discharge end filled with said material; and
(*e*): means for heating the material filling the discharge end of element (*a*) to melting, to form a liquid seal in said discharge end to prevent the escape of gas therethrough.

3. Apparatus for melting and outgassing in vacuo materials in divided form such as powder, granules, metal sponge and the like, which comprises the combination of elements designated as elements (*a*) to (*e*) inclusive and defined as follows:

(*a*): a duct for carrying said divided material and having intake and discharge ends;
(*b*): means including a water-jacket surrounding the discharge end of element (*a*) for cooling said discharge end;
(*c*): means for maintaining both ends of element (*a*) under vacuum;
(*d*): means for forcing said material through element (*a*) and out of the discharge end thereof, keeping said discharge end filled with said material; and
(*e*): means for heating the material filling the discharge end of element (*a*) to melting, to form a liquid seal in said discharge end to prevent the escape of gas therethrough.

4. Apparatus for melting and outgassing in vacuo materials in divided form such as powder, granules, metal sponge and the like, which comprises the combination of elements designated as elements (*a*) to (*d*) inclusive and defined as follows:

(*a*): a duct for carrying said divided material and having intake and discharge ends;
(*b*): means for feeding a continuous supply of said material through element (*a*) and out of the discharge end thereof;
(*c*): means for heating the material in the discharge end of element (*a*) to form a zone of molten material therein forming a liquid seal; and
(*d*): means for continuously exhausting through element (*a*) all gases liberated behind said seal in the melting of said material and simultaneously maintaining a vacuum at the discharge end of element (*a*).

5. Apparatus for melting and outgassing in vacuo materials in divided form such as powder, granules, metal sponge and the like, which comprises the combination of elements designated as elements (*a*) to (*e*) inclusive and defined as follows:

(*a*): a vacuum tank provided with an exhaust port adapted for connection to an exhaust system;
(*b*): a tubular duct for carrying said divided material and having an intake end and a discharge end, both opening into element (*a*) and at least the discharge end of said duct being conducting to make electrical contact with the material therein;
(*c*): means for continuously feeding said material through element (*b*) and out of the discharge end thereof;
(*d*): an electrode mounted to face the discharge end of said duct; and
(*e*): means for applying an electrical potential between the conductive discharge end of element (*b*) and element (*d*) to cause a discharge between the material within element (*b*) and element (*d*).

6. Apparatus for melting and outgassing in vacuo materials in divided form such as powder, granules, metal sponge and the like, which comprises the combination of elements designated as elements (*a*) to (*e*) inclusive and defined as follows:

(*a*): a vacuum tank provided with an exhaust port adapted for connection to an exhaust system;
(*b*): a tubular duct for carrying said divided material and having an intake end and a discharge end, both opening into element (*a*) and at least the discharge end of said duct being conducting to make electrical contact with the material therein;
(*c*): means for continuously feeding said material through element (*b*) and out of the discharge end thereof;
(*d*): a thermionically emissive cathode facing and spaced from the discharge end of element (*b*) and substantially parallel thereto;
(*e*): means for applying an electrical potential between the conductive discharge end of element (*b*) and element (*d*) to cause a discharge between the material within element (*b*) and element (*d*).

7. Apparatus for melting and outgassing in vacuo materials in divided form such as powder, granules, metal sponge and the like, which comprises the combination of elements designated as elements (*a*) and (*e*) inclusive and defined as follows:

(*a*): a vacuum tank provided with an exhaust port adapted for connection to an exhaust system;
(*b*): a tubular duct for carrying said divided material and having an intake end and a discharge end, both opening into element (*a*) and at least the discharge end of said duct being conducting to make electrical contact with the material therein;
(*c*): screw-conveyor means for forcing a continuous flow of said divided material through element (*b*);
(*d*): an electrode mounted to face the discharge end of said duct; and
(*e*): means for applying an electrical potential between the conductive discharge end of element (*b*) and element (*d*) to cause a discharge between the material within element (*b*) and element (*d*).

8. Apparatus for melting and outgassing in vacuo materials in divided form such as powder, granules, metal sponge and the like, which comprises the combination of elements designated as elements (*a*) to (*e*) inclusive and defined as follows:

(*a*): a vacuum tank provided with an exhaust port adapted for connection to an exhaust system;
(*b*): a tubular duct for said divided material mounted generally transversely within element (*a*) and having intake and discharge ends opening thereinto, the opening of said discharge end being inclined with respect to the horizontal and facing upward, at least the discharge end of said duct being conductive;

(*c*): means for continuously feeding said material through element (*b*) and out of the discharge end thereof;

(*d*): an electrode mounted to face the discharge end of said duct; and (*e*): means for applying an electrical potential between the conductive discharge end of element (*b*) and element (*d*) to cause a discharge between the material within element (*b*) and element (*d*).

9. Apparatus for melting and outgassing in vacuo materials in divided form such as powder, granules, metal sponge and the like, which comprises the combination of elements designated as elements (*a*) to (*f*) inclusive and defined as follows:

(*a*): a vacuum tank provided with an exhaust port adapted for connection to an exhaust system;

(*b*): a tubular metal duct for said material mounted generally transversely within element (*a*) and having intake and discharge ends opening thereinto, said discharge end being inclined with respect to the horizontal, facing upward;

(*c*): means for fluid-cooling element (*b*);

(*d*): means for continuously feeding said material through element (*b*) and out of the discharge end thereof;

(*e*): an electrode mounted to face the discharge end of said duct; and (*f*): means for applying an electrical potential between the conductive discharge end of element (*b*) and element (*d*) to cause a discharge between the material within element (*b*) and element (*d*).

10. Apparatus for melting and outgassing in vacuo materials in divided form such as powder, granules, metal sponge and the like, which comprises the combination of elements designated as elements (*a*) to (*g*) inclusive and defined as follows:

(*a*): a vacuum tank provided with an exhaust port adapted for connection to an exhaust system;

(*b*): a tubular metal duct for said material mounted generally transversely within element (*a*) and having intake and discharge ends opening thereinto, said discharge end being inclined with respect to the horizontal, facing upward;

(*c*): means for fluid-cooling element (*b*);

(*d*): means for continuously feeding said material through element (*b*) and out of the discharge end thereof;

(*e*): a thermionic cathode mounted within element (*a*) facing and in a general plane substantially parallel to the inclined discharge end of element (*b*) and spaced therefrom to form an electrical discharge path between said cathode and material within said element (*b*);

(*f*): focusing means for concentrating the electrical discharge from element (*d*) on said material substantially to the exclusion of element (*b*); and (*g*): terminals for applying an electrical potential between elements (*b*) and (*f*) to cause such electrical discharge.

11. Apparatus for melting and outgassing in vacuo materials in divided form such as powder, granules, metal sponge and the like, which comprises the combination of elements designated as elements (*a*) to (*h*) inclusive and defined as follows:

(*a*): a vacuum tank provided with an exhaust port adapted for connection to an exhaust system;

(*b*): a tubular duct for said divided material mounted generally transversely within element (*a*) and having intake and discharge ends opening thereinto, the opening of said discharge end being inclined with respect to the horizontal and facing upward, at least the discharge end of said duct being conductive;

(*c*): means for continuously feeding said material through element (*b*) and out of the discharge end thereof;

(*d*): an electrode mounted to face the discharge end of said duct;

(*e*): means for applying an electrical potential between the conductive discharge end of element (*b*) and element (*d*) to cause an electrical discharge between the material within element (*b*) and element (*d*).

(*f*): an ingot mold positioned vertically below the discharge end of element (*b*) to receive material melted by said electrical discharge;

(*g*): an annular thermionic cathode positioned over and adjacent to the top of element (*f*) and surrounding the path of material falling from element (*b*) to element (*f*); and (*h*): terminals for applying an electrical potential difference between elements (*f*) and (*g*) to cause an electrical discharge therebetween and maintain a molten zone at the surface of material caught in element (*f*) so as to form a homogeneous ingot of the material so caught.

12. Apparatus for melting and outgassing in vacuo materials in divided form such as powder, granules, metal sponge and the like, which comprises the combination of elements designated as elements (*a*) to (*i*) inclusive and defined as follows:

(*a*): a vacuum tank provided with an exhaust port adapted for connection to an exhaust system;

(*b*): a tubular duct for said divided material mounted generally transversely within element (*a*) and having intake and discharge ends opening thereinto, the opening of said discharge end being inclined with respect to the horizontal and facing upward, at least the discharge end of said duct being conductive;

(*c*): means for continuously feeding said material through element (*b*) and out of the discharge end thereof;

(*d*) an electrode mounted to face the discharge end of said duct;

(*e*): means for applying an electrical potential between the conductive discharge end of element (*b*) and element (*d*) to cause an electrical discharge between the material within element (*b*) and element (*d*);

(*f*): a continuous ingot mold comprising a fluid-cooled collar positioned vertically below the discharge end of element (*b*) to receive material melted by said electrical discharge;

(*g*): a vacuum seal adapted to surround an ingot formed of material congealed in element (*f*) and permit continuous withdrawal of such ingot;

(*h*): an annular thermionic cathode mounted above and adjacent to element (*f*) and surrounding the path of material falling from element (*b*); and (*i*): terminals for applying a potential difference between elements (*f*) and (*h*) to cause an electrical discharge between element (*h*) and material within element (*f*) to maintain a molten zone at the surface thereof.

References Cited in the file of this patent

UNITED STATES PATENTS

| | | |
|---|---|---|
| 432,995 | Filson et al. | July 29, 1890 |
| 1,629,968 | Richards | May 24, 1927 |
| 2,130,886 | Kemmer | Sept. 20, 1938 |